(12) United States Patent
Kim et al.

(10) Patent No.: US 8,436,060 B2
(45) Date of Patent: May 7, 2013

(54) ORGANIC AEROGEL AND COMPOSITION FOR THE ORGANIC AEROGEL

(75) Inventors: Kwang-Hee Kim, Seoul (KR);
Myung-Dong Cho, Hwaseong-si (KR);
Sang-Ho Park, Yongin-si (KR);
Sung-Woo Hwang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 168 days.

(21) Appl. No.: 12/982,148

(22) Filed: Dec. 30, 2010

(65) Prior Publication Data

US 2011/0245361 A1    Oct. 6, 2011

(30) Foreign Application Priority Data

Mar. 30, 2010   (KR) .................. 10-2010-0028824

(51) Int. Cl.
*C08F 222/40*   (2006.01)
*C08J 9/00*     (2006.01)

(52) U.S. Cl.
USPC ............ 521/61; 521/63; 521/64; 521/183; 521/184; 521/185; 521/189

(58) Field of Classification Search ............ 521/61, 521/63, 64, 183, 184, 185, 189
See application file for complete search history.

(56) References Cited

U.S. PATENT DOCUMENTS

| | | | |
|---|---|---|---|
| 3,549,481 | A | 12/1970 | Cesare et al. |
| 4,873,218 | A | 10/1989 | Pekala |
| 4,966,919 | A | 10/1990 | Williams, Jr. et al. |
| 4,997,804 | A | 3/1991 | Pekala |
| 5,124,364 | A | 6/1992 | Wolff et al. |
| 5,137,927 | A | 8/1992 | Wolff et al. |
| 5,159,049 | A | 10/1992 | Allen |
| 5,389,288 | A | 2/1995 | Rindo et al. |
| 5,420,168 | A | 5/1995 | Mayer et al. |
| 5,484,818 | A | 1/1996 | De Vos |
| 5,508,341 | A | 4/1996 | Mayer et al. |
| 5,945,084 | A | 8/1999 | Droege |
| 5,948,879 | A | 9/1999 | Mori |
| 5,990,184 | A | 11/1999 | Biesmans |
| 6,040,375 | A | 3/2000 | Behme et al. |
| 6,316,092 | B1 | 11/2001 | Frank et al. |
| 6,887,563 | B2 | 5/2005 | Frank et al. |
| 7,118,801 | B2 | 10/2006 | Ristic-Lehmann et al. |
| 7,282,466 | B2 | 10/2007 | Long et al. |
| 7,316,919 | B2 | 1/2008 | Childs et al. |
| 8,119,700 | B2 | 2/2012 | Park et al. |
| 2001/0038933 | A1 | 11/2001 | Gebhardt et al. |
| 2002/0173554 | A1 | 11/2002 | Baumann et al. |
| 2004/0142149 | A1 | 7/2004 | Mollendorf et al. |
| 2005/0131089 | A1 | 6/2005 | Kocon |
| 2007/0036959 | A1 | 2/2007 | Yamoto et al. |
| 2007/0087120 | A1 | 4/2007 | Connors, Jr. et al. |
| 2007/0167534 | A1 | 7/2007 | Coronado et al. |
| 2007/0208124 | A1 | 9/2007 | Schiraldi et al. |
| 2007/0259169 | A1 | 11/2007 | Williams et al. |
| 2008/0087870 | A1 | 4/2008 | Williams et al. |
| 2008/0112876 | A1 | 5/2008 | Dailey |
| 2008/0188581 | A1 | 8/2008 | Lee et al. |
| 2008/0220333 | A1 | 9/2008 | Yano et al. |
| 2008/0287561 | A1 | 11/2008 | Menashi et al. |
| 2009/0029147 | A1 | 1/2009 | Tang et al. |
| 2009/0035344 | A1 | 2/2009 | Thomas et al. |
| 2010/0204347 | A1 | 8/2010 | Park et al. |
| 2011/0071231 | A1 | 3/2011 | Park et al. |
| 2011/0105636 | A1 | 5/2011 | Kim et al. |
| 2011/0201713 | A1 | 8/2011 | Kim et al. |
| 2011/0237698 | A1 | 9/2011 | Park et al. |
| 2011/0245362 | A1 | 10/2011 | Hwang et al. |
| 2011/0311802 | A1 | 12/2011 | Cho et al. |

FOREIGN PATENT DOCUMENTS

| | | |
|---|---|---|
| CN | 101525248 B | 7/2012 |
| DE | 1964188 A1 | 7/1970 |
| EP | 0994912 A | 1/1994 |
| EP | 0995773 A2 | 4/2000 |
| JP | 4732742 A | 11/1972 |
| JP | 05-319899 A | 12/1993 |
| JP | 2000-119433 A | 4/2000 |
| JP | 2008132676 A | 6/2008 |
| JP | 2008221385 A | 9/2008 |
| JP | 2008231258 A | 10/2008 |
| KR | 1996-7003975 | 8/1996 |
| KR | 1019990044531 A | 6/1999 |
| KR | 10-0282964 | 12/2000 |
| KR | 1020010017538 A | 3/2001 |
| KR | 1020040011915 A | 2/2004 |
| KR | 1020040106289 A | 12/2004 |
| KR | 1020050037557 A | 4/2005 |
| KR | 1020050073500 A | 7/2005 |
| KR | 1020050118119 A | 12/2005 |
| KR | 1020060099514 A | 9/2006 |

(Continued)

OTHER PUBLICATIONS

"Aerogels-Airy Materials: Chemistry, Structure, and Properties", Nicola Husing and Ulrich Schubert, Angewandte Chemie Int. Ed. Engl., 1998, 37,22-45.

"Three-Dimensional Core-Shell Superstructures: Mechanically Strong Aerogels", Nicholas Leventis, Acc Chem. Res. 2007, 40, 874-884.

"High Performance Bismaleimide Matrices: Cure Kinetics and Mechanism", Boris A. Rozenberg, Emma A. Dzhavadyan, Roger Morgan and Eugene Shin, Polymers for Advanced Technology, 13, 837-844 (2002).

"Carbon Aerogel-Based High Temperature Thermal Insulation", M. Wiener, G. Reichenauer, S. Braxmeier, F. Hemberger, H.-P. Ebert, Int J Thermophys (2009) 30:1372-1385.

(Continued)

*Primary Examiner* — Irina S Zemel
(74) *Attorney, Agent, or Firm* — Cantor Colburn LLP

(57) ABSTRACT

An organic aerogel includes a polymer prepared from a substituted or unsubstituted maleimide compound and a compound having at least two vinyl groups. A composition for the organic aerogel includes a substituted or unsubstituted maleimide compound and a compound having at least two vinyl groups.

7 Claims, 1 Drawing Sheet

FOREIGN PATENT DOCUMENTS

| | | |
|---|---|---|
| KR | 10-0666110 B1 | 1/2007 |
| KR | 1020090059321 A | 6/2009 |
| KR | 1020090061301 A | 6/2009 |
| KR | 10-0911845 B | 8/2009 |
| WO | 96/26915 A1 | 9/1996 |
| WO | 2008104491 A1 | 9/2008 |
| WO | 2008114524 A1 | 9/2008 |
| WO | 2009033070 A1 | 3/2009 |

OTHER PUBLICATIONS

"Porous structure of polybenzoxazine-based organic aerogel prepared by sol-gel process and their carbon aerogels", Parkpoom Lorjai, Thanyalak Chaisuwan, Sujitra Wongkasemjit, J Sol-Gel Sci Technol (2009) 52:56-64.

"Molecular design of polymer precursors for controlling microstructure of organic and carbon aerogels", Donghui Long, Xiaojun Liu, Wenming Qiao, Rui Zhang, Liang Zhan, Licheng Ling, Journal of Non-Crystalline Solids, 2009, 355, 1252-1258.

"Polyol-Mediated Synthesis of Nanoscale Functional Materials", Claus Feldmann, Advanced Functional Materials, 2003,13, No. 2, February,101-107.

European Extended Search Report—EP 10191930.6 dated May 11, 2011.

Aaltonen, O. et al., The preparation of lignocellulosic aerogels from ionic liquid solutions, Carbohydrate Polymers, 2009, vol. 75: 125-129.

Al-Muhtaseb, S.A. et al., Preparation and Properties of Resorcinol-Formaldehyde Organic and Carbon Gels, Advanced Materials, 15,101-114 (2003).

Aoki, H. et al., Basic Study of the Gelation of Dimethacrylate-Type Crosslinking Agents, J. of Polymer Sci Part A: Polymer Chem, 2006, 44: 949-958.

Capadona, L. A. et al., Flexible, Low-Density Polymer Crosslinked Silica Aerogels. Polymer, 2006; vol. 47: 5754-5761.

Chowdhury, R., Electron-Beam-Induced Crosslinking of Natural Rubber/Acrylonitrile•Butadiene Rubber Latex Blends in the Presence of Ethoxylated Pentaerythritol Tetraacrylate Used as a Crosslinking Promoter, J. of Applied Polymer Sci, 2007, vol. 103 (2): 1206-1214.

EP Extended Search Report for Application No. 11170821.0 dated Nov. 30, 2011.

EP Search Report for Application No. 11158144.3 dated Jul. 29, 2011.

Fischer, F. et al., Cellulose-based aerogels, Polymer, 2006, vol. 47: 7636-7645.

Gavillon, R. et al., Aerocellulose: New Highly Porous Cellulose Prepared from Cellulose—NaOH Aqueous Solutions, Biomacromolecules, 2008, vol. 9: 269-277.

Gu, W. et al., Polymerized Gels and 'Reverse Aerogels' from Methyl Methacrylate or Styrene and Tetraoctadecylammonium Bromide as Gelator, Chem. Commun. 1997, 6, pp. 543-544.

Hebb, A. et al., Synthesis of porous cross-linked polymer monoliths using 1,1,1,2-tetrafluoroethane (R134a) as the porogen, Composites Science and Technology, 2003, vol. 63: 2379-2387.

Hoepfner, S. et al., Synthesis and characterisation of nanofibrillar cellulose aerogels, Cellulose, 2008, vol. 15: 121-129.

Iler, R.K.,1978. "The Chemistry of Silica", John Wiley & Sons, New York.

Innerlohinger, J. et al., Aerocellulose: Aerogels and Aerogel-like Materials made from Cellulose, Macromol. Symp., 2006, vol. 244: 126-135.

Jin, H. et al., Nanofibrillar cellulose aerogels, Colloids and Surfaces A: Physicochem. Eng. Aspects, 2004, vol. 240 (1-3): 63-67.

Jirglova, H. et al., Synthesis and Properties of Phloroglucinol-Phenol-Formaldehyde Carbon Aerogels and Xerogels, Langmuir, 2009; 25(4): 2461-2466.

Kaczmarek, H. et al., Networks of Photocrosslinked Poly(meth)acrylates in Linear Poly(vinyl chloride), Networks of , J. Appl. Polym. Sci., 2002, 86, 375-3734.

Kanamori, K. et al., New Transparent Methylsilsesquioxane Aerogels and Xerogels with Improved Mechanical Properties, Advanced Materials, 2007, vol. 19(12): 1589-1593.

Katanyoota, P. et al., Novel polybenzoxazine-based carbon aerogel electrode for supercapacitors, Materials Science and Engineering: B, 2010, vol. 167(1): 36-42.

Leventis, N. et al., Nanoengineering Strong Silica Aerogels, Nano Letters, 2002, vol. 2 (9): 957-960.

Liebner, F. et al., Cellulose aerogels: highly porous, ultra-lightweight materials, Holzforschung, 2008, vol. 62: 129-135.

Liebner, F. et al., Cellulosic aerogels as ultra-lightweight materials. Part 2: synthesis and properties, Holzforschung, 2009, vol. 63: 3-11.

Mulik, S. et al, Cross-Linking 3D Assemblies of Nanoparticles into Mechanically Strong Aerogels by Surface-Initiated Free-Radical Polymerization, Chem. Mater., 2008, 20 (15): 5035-5046.

Mulik, S. et al., Time-Efficient Acid-Catalyzed Synthesis of Resorcinol-Formaldehyde Aerogels, Chem. Mater., 2007, 19, pp. 5138-6144.

Paguio, R.R. et al., Fabrication Capabilities for Spherical Foam Targets Used in ICF Experiments,17th Target Fabrication Specialist Meeting, San Diego, CA, Oct. 1-5, 2006. Also published on IEEE Xplore.

Pekala, R. W. et al., "Structure of organic aerogels 1. Morphology and scaling", Macromolecules 26 (1993): 5487-5493.

Pekala, R.W. "Organic aerogels from the polycondensation of resorcinol with formaldehyde", Journal of Materials Science, 1989, 24(9): 3221-3227.

Science Magazine, Editor's Choice Section, "Materials Science Spongy Clay?", Oct. 21, 2005, vol. 310; 5747: 407c.

Tan, C. et al., Organic Aerogels with Very High Impact Strength, Advanced Materials, 2001, vol. 13 (9): 644-646.

Chaisuwan, T. et al., "Novel Carbon Aerogel Prepared from Benzoxazine Precursors via Ambient Drying: Effect of Amine Derivatives", PMSE Preprints, vol. 100, Spring 2009, 3 pages.

Chaisuwan, T. et al., "Removal of heavy metals from model wastewater by using polybenzoxazine aerogel", Desalination 256 (2010), pp. 108-114.

Katanyoota, P., et al., "Novel polybenzoxazine-based carbon aerogel electrode for supercapacitors," Materials Science and Engineering B, vol. 167, 2010, pp. 36-42.

Komalwanich, T. et al., "Removal of Heavy Metals from Wastewater by Polybenzoxazine-based Aerogel", PMSE Preprints, vol. 100, Spring 2009, 3 pages.

Yang, J. et al., "Compressive behaviors and morphological changes of resorcinol-formaldehyde aerogel at high strain rates", Microporous and Mesoporous Materials, vol. 133, 2010, pp. 134-140.

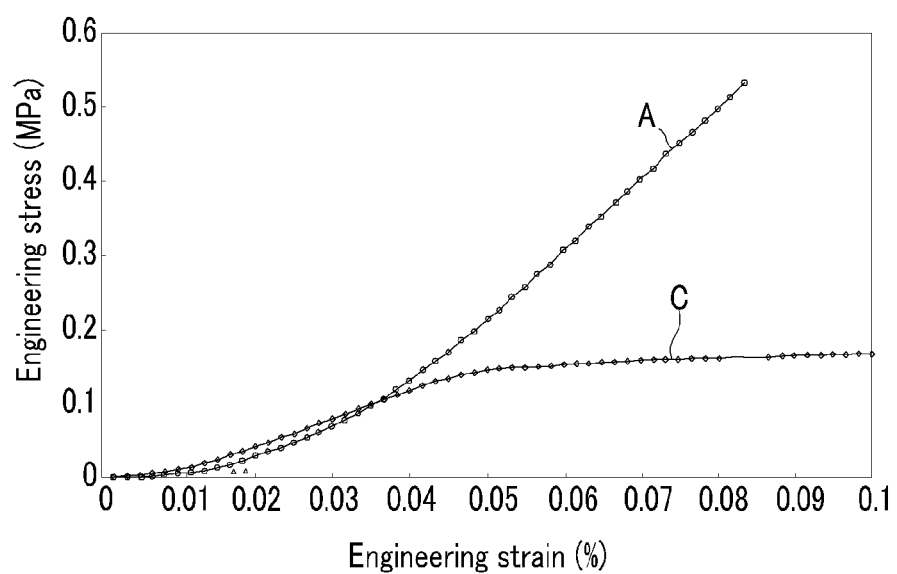

ORGANIC AEROGEL AND COMPOSITION FOR THE ORGANIC AEROGEL

CROSS-REFERENCE TO RELATED APPLICATION

This application claims priority to Korean Patent Application No. 10-2010-0028824, filed on Mar. 30, 2010, and all the benefits accruing therefrom under 35 U.S.C. 119, the content of which in its entirety is herein incorporated by reference.

BACKGROUND

1. Field

This disclosure relates to an organic aerogel and a composition for the organic aerogel.

2. Description of the Related Art

An aerogel is a mesoporous material having a nanometer-sized three-dimensional porous structure. With both excellent insulation and a sound-absorbing properties, aerogels have diverse applications. For example, an aerogel may be used to insulate a cooling device such as a refrigerator and a freezer, as an adiabatic material for the aerospace industry, and for building construction.

Aerogels may be inorganic aerogels or organic aerogels, depending on the particular material and composition.

An example of an inorganic aerogel is a silica-based aerogel. Such aerogels may tend to be relatively rigid and inflexible due to the tetrahedral substructures of silica-based components. An organic aerogel, however, may include more flexible organic linking groups and thus may be more flexible than an inorganic aerogel.

SUMMARY

An organic aerogel may have various properties according to its chemical structure.

One or more embodiments provides an organic aerogel having improved properties.

In addition, one or more embodiments provides a composition for an organic aerogel for preparing the organic aerogel.

In one or more embodiments, an organic aerogel includes a polymer obtained from a substituted or unsubstituted maleimide compound and a compound having at least two vinyl groups.

In one or more embodiments, a composition for an organic aerogel includes a substituted or unsubstituted maleimide compound and a compound having at least two vinyl groups.

The substituted or unsubstituted maleimide compound may be represented by the following Chemical Formula 1.

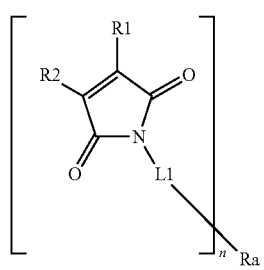

Chemical Formula 1

In Chemical Formula 1, R1 and R2 are independently hydrogen or a substituted or unsubstituted C1 to C30 alkyl group, and L1 is selected from a single bond, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, and a combination comprising at least one of the foregoing groups.

In Chemical Formula 1, n is an integer of from 1 to 3, and when n is 1, Ra is a substituted or unsubstituted C3 to C30 cycloalkyl group, a substituted or unsubstituted C6 to C30 aryl group, a substituted or unsubstituted C3 to C30 cycloalkyl group including N, O, S, or P, a substituted or unsubstituted C6 to C30 aryl group including N, O, S, or P, or a combination comprising at least one of the foregoing groups, while when n is 2 or 3, Ra is a substituted or unsubstituted C3 to C30 cycloalkylene group, a substituted or unsubstituted C6 to C30 arylene group, a substituted or unsubstituted C3 to C30 cycloalkylene group including N, O, S, or P, a substituted or unsubstituted C6 to C30 arylene group including N, O, S, or P, or a combination comprising at least one of the foregoing groups.

The substituted or unsubstituted maleimide compound may be represented by the following Chemical Formula 2.

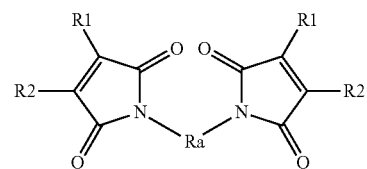

-Chemical Formula 2

In Chemical Formula 2, R1 and R2 are independently hydrogen or a substituted or unsubstituted C1 to C30 alkyl group, and Ra is a substituted or unsubstituted C3 to C30 cycloalkylene group, a substituted or unsubstituted C6 to C30 arylene group, a substituted or unsubstituted C3 to C30 cycloalkylene group including N, O, S, or P, a substituted or unsubstituted C6 to C30 arylene group including N, O, S, or P, or a combination comprising at least one of the foregoing groups.

The substituted or unsubstituted bismaleimide compound may be represented by at least one of the compounds represented by the following Chemical Formulae 3 to 5.

Chemical Formula 3

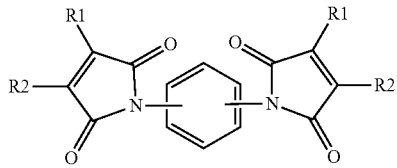

Chemical Formula 4

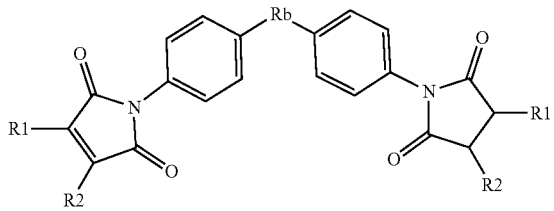

Chemical Formula 5

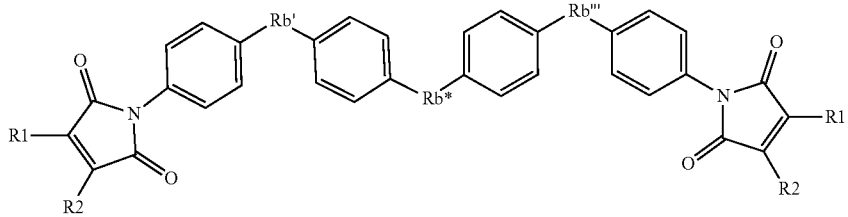

In Chemical Formulae 3 to 5, R1 and R2 are independently hydrogen or a substituted or unsubstituted C1 to C30 alkyl group, and Rb, Rb', Rb", and Rb''' are independently a C1 to C10 alkyl group, a C1 to C10 heteroalkyl group, N, O, S, P, or a combination comprising at least one of the foregoing groups.

The compound having at least two vinyl groups may include a substituted or unsubstituted aromatic compound having at least two vinyl groups, a substituted or unsubstituted acrylate compound, a substituted or unsubstituted acrylamide compound, or a combination comprising at least one of the foregoing compounds.

The compound having at least two vinyl groups may include at least one of the compounds represented by the following Chemical Formulae 6 to 11.

Chemical Formula 6

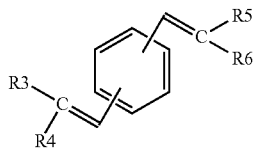

Chemical Formula 7

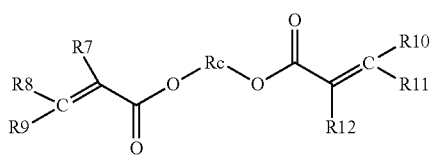

Chemical Formula 8

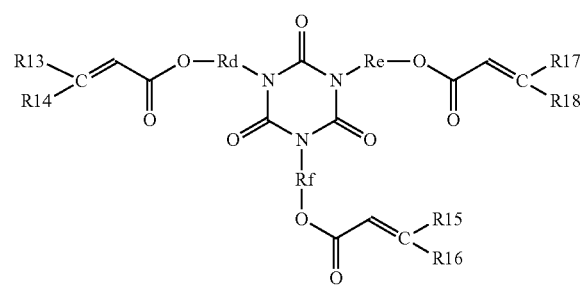

-continued

Chemical Formula 9

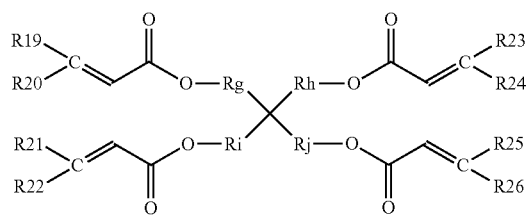

Chemical Formula 10

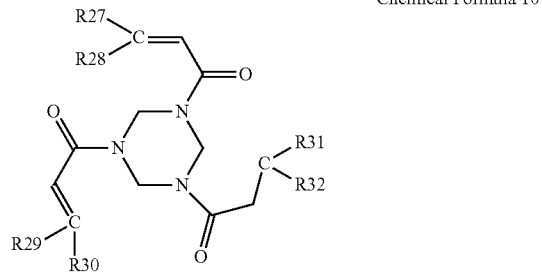

Chemical Formula 11

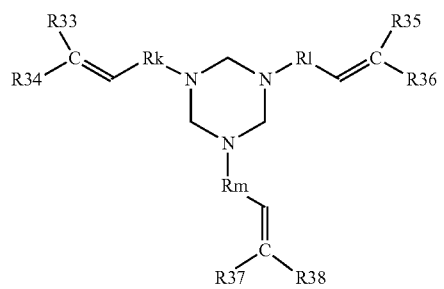

In Chemical Formulae 6 to 11, R3 to R38 are independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C30 alkoxy group, a substituted or unsubstituted carbonyl group, a hydroxy group, or a combination comprising at least one of the foregoing groups, and Rc to Rm are independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, or a combination comprising at least one of the foregoing groups.

The organic aerogel may have a plurality of pores having an average size ranging from about 2 to about 50 nm.

The substituted or unsubstituted maleimide compound and the compound having at least two vinyl groups are respectively included in an amount ranging from about 5 to about 35 wt % and from about 65 to about 95 wt % based on the amount of maleimide compound and the compound having at least two vinyl groups, excluding the solvent.

BRIEF DESCRIPTION OF THE DRAWINGS

The FIGURE is a plot of stress versus strain showing mechanical strength of an organic aerogel according to Example 1 and a comparative example.

DETAILED DESCRIPTION OF THE EMBODIMENTS

Hereinafter, exemplary embodiments of the present invention are illustrated in detail with reference to the accompanying drawing, so that it can be readily understood by those who have common knowledge in a related field. However, the present invention can be realized in various ways and is not limited thereto.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof. All ranges and endpoints reciting the same feature are independently combinable.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "Alkyl" refers to a straight or branched chain saturated aliphatic hydrocarbon having the specified number of carbon atoms. "Alkenyl" is a straight or branched chain hydrocarbon that comprises at least one carbon-carbon double bond. "Alkoxy" refers to an alkyl moiety that is linked via an oxygen (i.e., —O-alkyl). Nonlimiting examples of C1 to C30 alkoxy groups include methoxy groups, ethoxy groups, propoxy groups, isobutyloxy groups, sec-butyloxy groups, pentyloxy groups, iso-amyloxy groups, and hexyloxy groups. The term "alkylene" refers to a straight, branched or cyclic divalent aliphatic hydrocarbon group. The term "alkynyl" refers to a straight or branched chain hydrocarbon that has one or more unsaturated carbon-carbon bonds, at least one of which is a triple bond. As used herein "amide" generally refers to the group —C(O)NRR, wherein each R is independently hydrogen, a C1 to C6 alkyl, or a C6 to C12 aryl. As used herein "amine" has the general formula NRR, wherein each R is independently hydrogen, an alkyl group, or an aryl group. As used herein "aryl," means a cyclic moiety in which all ring members are carbon and at least one ring is aromatic. More than one ring may be present, and any additional rings may be independently aromatic, saturated or partially unsaturated, and may be fused, pendant, spirocyclic or a combination thereof. An "arylalkylene" group is an aryl group linked via an alkylene moiety. The specified number of carbon atoms (e.g., C7 to C30) refers to the total number of carbon atoms present in both the aryl and the alkylene moieties. Representative arylalkyl groups include, for example, benzyl groups. As used herein, "arylalkyl" refers to an alkylene group in which one of the hydrogen atoms of the alkylene is replaced by an aryl group. As used herein, the term "arylene" refers to a divalent radical formed by the removal of two hydrogen atoms from one or more rings of an aromatic hydrocarbon, wherein the hydrogen atoms may be removed from the same or different rings (preferably different rings), each of which rings may be aromatic or nonaromatic. "Aryloxy" refers to an aryl moiety that is linked via an oxygen (i.e., —O-aryl). "Cycloalkylene" refers to a divalent radical formed by the removal of two hydrogen atoms from one or more rings of a cycloalkyl group (a nonaromatic hydrocarbon that comprises at least one ring). A "heteroalkyl" group is an alkyl group that comprises at least one heteroatom covalently bonded to one or more carbon atoms of the alkyl group. A "heteroaryl" group is a monovalent carbocyclic ring system that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. A "heteroarylalkyl" group is a heteroaryl group linked via an alkylene moiety. The specified number of carbon atoms (e.g., C3 to C30) refers to the total number of carbon atoms present in both the aryl and the alkylene moieties, with remaining ring atoms being heteroatoms as discussed above. "Heteroarylene" refers to a divalent radical formed by the removal of two hydrogen atoms from one or more rings of a heteroaryl moiety, wherein the hydrogen atoms may be removed from the same or different rings (preferably the same ring), each of which rings may be aromatic or nonaromatic. As used herein, "combination" is inclusive of blends, mixtures, alloys, reaction products, and the like.

As used herein, when a definition is not otherwise provided, a hydrogen atom in a "substituted" compound may be substituted with a substituent selected from a C1 to C30 alkyl group, a C2 to C30 alkynyl group, a C6 to C30 aryl group, a C7 to C30 aryl alkyl group, a C1 to C4 oxy alkyl group, a C1 to C30 hetero alkyl group, a C3 to C30 hetero aryl alkyl group, a C3 to C30 cyclo alkyl group, a C3 to C15 cycloalkenyl group, a C6 to C30 cycloalkynyl group, a C2 to C30 heterocyclo alkyl group, a halogen atom (F, Cl, Br, I), a hydroxyl group, a C1 to C30 alkoxy group, a nitro group, a cyano group, an amino group, an azido group, an amidino group, a hydrazine group, a hydrazono group, a carbonyl group, a carbamyl group, a thiol group, an ester group, a carboxyl group, or a salt thereof, a sulfonic acid group or a salt thereof, phosphoric acid or a salt thereof, and a combination comprising at least one of the foregoing groups.

In addition, as used herein, when a definition is not otherwise provided, "hetero" indicates the inclusion of 1 to 3 hetero atoms selected from N, O, S, P, or a combination comprising at least one of the foregoing atoms.

Hereinafter, an organic aerogel according to an embodiment is illustrated.

According to an embodiment, an organic aerogel is prepared from a composition for an organic aerogel including a substituted or unsubstituted maleimide compound and a compound having at least two vinyl groups (hereinafter referred to as a "vinyl compound").

The substituted or unsubstituted maleimide compound includes a compound represented by the following Chemical Formula 1.

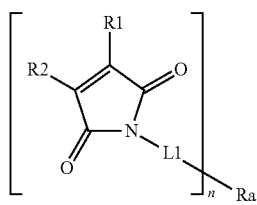

Chemical Formula 1 least one of the foregoing groups, while when n is 2 or 3, Ra is a substituted or unsubstituted C3 to C30 cycloalkylene group, a substituted or unsubstituted C6 to C30 arylene group, a substituted or unsubstituted C3 to C30 cycloalkylene group including N, O, S, or P, a substituted or unsubstituted C6 to C30 arylene group including N, O, S, or P, or a combination comprising at least one of the foregoing groups.

The substituted or unsubstituted maleimide compound may be a bismaleimide compound represented by the following Chemical Formula 2.

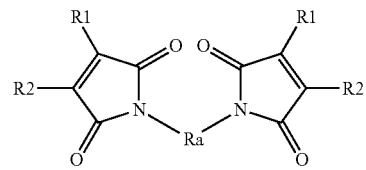

Chemical Formula 2

In Chemical Formula 2, R1, R2, and Ra are the same as described in Chemical Formula 1, above.

The bismaleimide compound may be a compound represented by at least one of the compounds represented by the following Chemical Formulae 3 to 5.

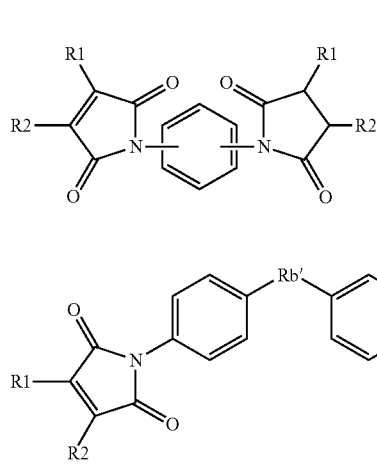

Chemical Formula 3

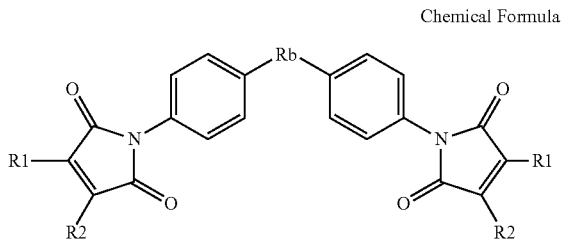

Chemical Formula 4

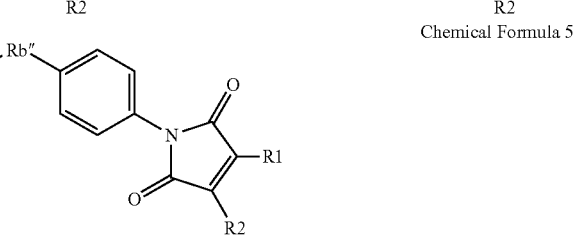

Chemical Formula 5

In Chemical Formula 1, R1 and R2 are independently hydrogen or a substituted or unsubstituted C1 to C30 alkyl group, L1 is a single bond, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, or a combination comprising at least one of the foregoing groups.

n may be an integer of from 1 to 3, and when n is 1, Ra is a substituted or unsubstituted C3 to C30 cycloalkyl group, a substituted or unsubstituted C6 to C30 aryl group, a substituted or unsubstituted C3 to C30 cycloalkyl group including N, O, S, or P, a substituted or unsubstituted C6 to C30 aryl group including N, O, S, or P, or a combination comprising at In the above Chemical Formulae 3 to 5, R1 and R2 are respectively the same as aforementioned, and Rb, Rb', Rb'', and Rb''' are independently a C1 to C10 alkyl group, a C1 to C10 heteroalkyl group, N, O, S, P, or a combination comprising at least one of the foregoing groups.

The compound represented by the above Chemical Formula 3 may include ortho, meta, or para substituents and may be, for example, a compound represented by the following Chemical Formula 3a, and the compound represented by the above Chemical Formula 4 may be a compound represented by the following Chemical Formula 4a or 4b. The compound represented by the above Chemical Formula 5 may be a compound represented by the following Chemical Formula 5a.

Chemical Formula 3a

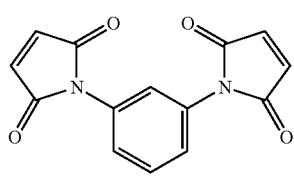

Chemical Formula 4a

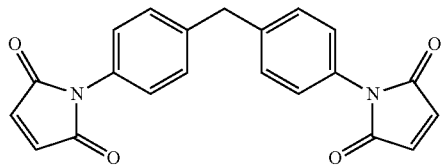

Chemical Formula 4b

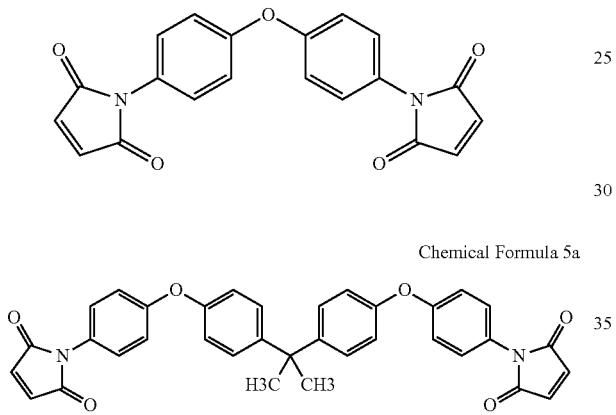

Chemical Formula 5a

The vinyl compound has a substituted or unsubstituted vinyl group, and may include a substituted or unsubstituted C6 to C30 aromatic compound, a substituted or unsubstituted acrylate compound, a substituted or unsubstituted acrylamide compound, or a combination comprising at least one of the foregoing compounds.

The vinyl compound can include at least one of the compounds represented by the following Chemical Formulae 6 to 11.

Chemical Formula 6

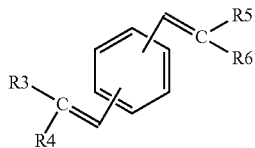

Chemical Formula 7

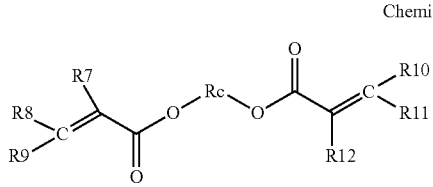

Chemical Formula 8

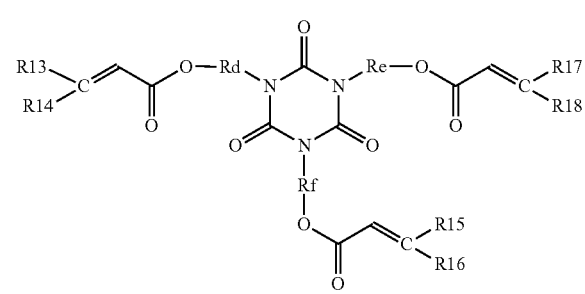

Chemical Formula 9

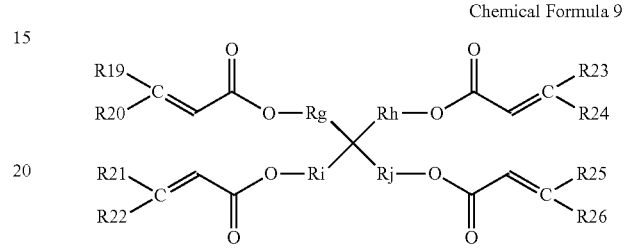

Chemical Formula 10

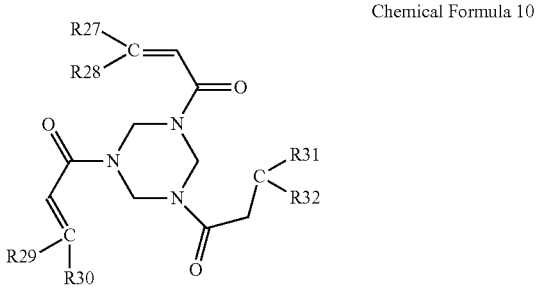

Chemical Formula 11

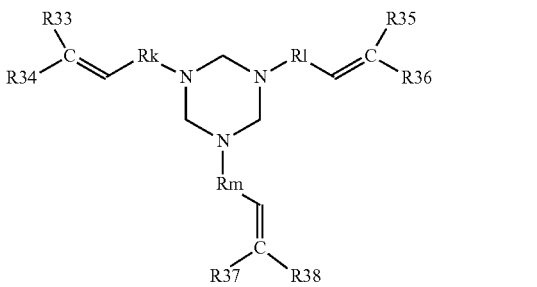

In Chemical Formulae 6 to 11, R3 to R38 are independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C30 alkoxy group, a substituted or unsubstituted carbonyl group, a hydroxy group, or a combination comprising at least one of the foregoing groups, and Rc to Rm are independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, or a combination comprising at least one of the foregoing groups. Also, the substituents of Chemical Formula 6 may be ortho, meta, or para substituents.

The substituted or unsubstituted maleimide compound and the vinyl compound may be reacted together in the presence or absence of a solvent.

Herein, where a solvent is used, the solvent may be an organic solvent. The organic solvent may include, for example, N,N-dimethyl formamide, N-methylpyrrolidone, acetone, 1,4-dioxane, tetrahydrofuran, dimethylsulfoxide, toluene, benzene, dichlorobenzene (o, m, or p), acetonitrile, an alcohol such as methanol, ethanol, n-propanol, isopropanol, n-butanol, t-butanol, glycols including ethylene glycol, propylene glycol, butylene glycol, diethylene glycol, dipropylene glycol, 2-methoxy-1-propanol, and the like, or a combination comprising at least one of the foregoing solvents.

The substituted or unsubstituted maleimide compound and the vinyl compound are respectively included in an amount of from about 5 to 35 wt % and from about 65 to 95 wt %, respectively, based on the total amount of the maleimide compound and the vinyl compound, and excluding the solvent.

The maleimide compound has an electron-withdrawing moiety drawing electron density to the maleimide group, and the vinyl compound has an electron-donating moiety providing electrons to the vinyl group. These compounds react together and form a polymer having high mechanical strength and excellent insulation characteristics.

The organic aerogel comprising the polymer has a plurality of mesopores. The mesopores have an average size of about 2 to about 50 nm. As understood herein, mesopore size is reported as an average, based on pore size determination methods such as, for example, surface area based on nitrogen diffusion (BET) or other suitable methods commonly used in the art. The pore size may also be determined and measured directly by microscopy such as scanning electron microscopy (SEM), transmission electron microscopy (TEM), or the like, and averaged.

These mesopores form a branch-shaped cluster and thus can impart high structural strength and flexibility to the organic aerogel. In an embodiment, the pore structure of the organic aerogel comprises a combination of micropores and mesopores. Since the mesopores impart high strength and flexibility, it is believed that the smaller micropores (i.e., pores having an average pore size <2 nm) that may also be present in the organic aerogel may not be destroyed due to contraction during the manufacturing process and may maintain the desired pore size, to provide a high specific surface area and insulation characteristics of an organic aerogel.

Hereinafter a method of manufacturing an organic aerogel is described.

The organic aerogel may be prepared by polymerizing a composition for an organic aerogel into a wet gel, and drying the polymer.

In the method, a composition for an organic aerogel is prepared.

The composition for an organic aerogel may include a substituted or unsubstituted maleimide compound, a vinyl compound, and a solvent, as described hereinabove.

The composition may further include a reaction initiator and/or catalyst.

The reaction initiator may be, for example, a radical initiator. The type and amount of the initiator are not particularly limited but may include, for example, an inorganic radical initiator such as ammonium persulfate, included in an amount of less than or equal to 5 wt % based on the total weight of maleimide compound, vinyl compound, and initiator, provided the radical initiator is decomposed under the processing conditions used, and so can produce an initiating radical.

The catalyst may be selected from the group consisting of, for example, an acid catalyst such as hydrochloric acid (HCl), hydrogen bromide (HBr), sulfuric acid ($H_2SO_4$), acetic acid, p-toluenesulfonic acid, and the like; a base catalyst such as sodium hydroxide (NaOH), sodium hydrogen carbonate ($NaHCO_3$), potassium hydroxide (KOH), potassium hydrogen carbonate ($KHCO_3$), ammonium hydroxide ($NH_4OH$), and an amine compound; and any combination thereof.

The composition is prepared into a polymer by a polymer-forming reaction, and the polymer is prepared into an organic aerogel by a sol-gel reaction in which the polymer is crosslinked to form the pore structure.

Then, the resulting wet-gel can be subject to a solvent-substitution. Herein, the solvent has no particular limit, as long as the solvent has good compatibility with liquid carbon dioxide. However, the solvent substitution reaction can be omitted when the wet-gel is dried under high pressure or prepared using the solvent having good compatibility with carbon dioxide.

The wet-gel is then dried. Drying may include, for example, supercritical drying, drying under either high or reduced pressures, or any combination thereof.

The supercritical drying can be performed by using, for example, supercritical carbon dioxide. In this method, liquid carbon dioxide is provided in a high pressure reactor to remove a solvent remaining in the wet-gel, and the liquid carbon dioxide and solvent is then slowly removed by increasing the temperature and/of reducing the pressure beyond the supercritical threshold point (304K, 73 atm). The supercritical drying can, in this way, be performed at slightly above room temperature (i.e., about 304K), and the method has excellent processibility and safety.

Drying under high pressure may also be used as a method to dry a wet-gel by common heating, and may be performed atatmospheric pressure or under vacuum. When a solvent is removed by drying under high pressure, a xerogel may in this way be prepared from an aerogel.

A freeze drying method may also be used to remove a solvent by freezing the wet-gel under reduced pressure and removing the frozen solvent (e.g., ice, or an ice-solvent combination) by sublimating. When a solvent is removed by drying under reduced pressure, a cryogel may thus be prepared from an aerogel.

Hereinafter, the present invention is illustrated referring to examples. However, the following examples are exemplary for illustration of the present invention but do not limit the present invention.

Preparation of an Organic Aerogel

Example 1

4 g of N,N'-1,3-phenylenebismaleimide and 26 g of 1,3-triacryloylhexahydro-1,3,5-triazine represented by the above Chemical Formula 3a were dissolved in 250 g of N-methylpyrrolidone ("NMP") in an appropriate-sized cylindrical polypropylene vial, and 0.9 g of 2,2'-azobisisobutyronitrile ("AIBN") is added as a radical initiator. The mixture is allowed to stand in an oven at 80° C. for 4 hours. Next, formation of the wet gel is identified by checking fluidity at the interface, and the wet gel is washed about five times with methanol to substitute a solvent. Then, the wet gel is dried using supercritical carbon dioxide, to prepare an organic aerogel.

Example 2

An organic aerogel is prepared according to the same method as Example 1, except that 8 g of N,N'-1,3-phenylenebismaleimide and 22 g of 1,3-triacryloylhexahydro-1,3,5-triazine is used instead.

Example 3

An organic aerogel is prepared according to the same method as Example 1, except that 12 g of N,N'-1,3-phenylenebismaleimide and 18 g of 1,3-triacryloylhexahydro-1,3,5-triazine is used instead.

Example 4

An organic aerogel is prepared according to the same method as Example 1, except that 22 g of 1,3-triacryloylhexahydro-1,3,5-triazine is used, and 8 g of 4,4'-diphenylmethane bismaleimide represented by the above Chemical Formula 4a (BMI-1000, Daiwa Kasei Co.) is used instead of N,N'-1,3-phenylenebismaleimide.

Example 5

An organic aerogel is prepared according to the same method as Example 1, except that 22 g of 1,3-triacryloylhexahydro-1,3,5-triazine is used, and 8 g of 4,4'-diphenyloxy bismaleimide represented by the above Chemical Formula 4b (Oxy BMI-1000, Daiwa Kasei Co.) is used instead of N,N'-1,3-phenylenebismaleimide.

Example 6

An organic aerogel is prepared according to the same method as Example 1, except that 22 g of 1,3-triacryloylhexahydro-1,3,5-triazine is used, and 8 g of bisphenol A diphenylether bismaleimide represented by the above Chemical Formula 5a (BMI-4000, Daiwa Kasei Co.) is used instead of N,N'-1,3-phenylenebismaleimide.

Comparative Example

An organic aerogel is prepared according to the same method as Example 1, except that 30 g of 1,3-triacryloylhexahydro-1,3,5-triazine is used instead of N,N'-1,3-phenylenebismaleimide.

Evaluation-1

The organic aerogels according to Example 1 and the comparative example are evaluated for mechanical strength. Their mechanical strength is measured by mounting a sample of the cured organic aerogel having a thickness of 1.5 cm and a size of 3 cm×3 cm in a jig for compression on a universal testing machine, and compressing the organic aerogels at rate of 10 mm/min.

The results are illustrated in the FIGURE.

The FIGURE shows a plot of mechanical strength of the organic aerogel prepared according to Example 1 (A) and the comparative example (C).

In the FIGURE, the horizontal (x) axis is engineering strain reported as a percentage, which indicates the compressed displacement depending on air pressure, while the vertical (y) axis indicates the engineering strength (in megapascals, MPa) of the organic aerogels. Their compressive strength can be measured from the slope of the plotted data.

Referring to FIGURE, the organic aerogel A according to Example 1 exhibits three times better compressive strength than the organic aerogel C of the comparative example. Accordingly, the organic aerogel A of Example 1 has excellent mechanical strength superior to that of the comparative example.

Evaluation-2

Samples of the organic aerogels according to Examples 1 to 6 and the comparative example are each measured for properties of shrinkage (in units of percent (%) from initial measurement), density (in grams per cubic centimeter, $g/cm^3$), and thermal conductivity (in units of milliWatts per meter-Kelvin, mW/mK).

The linear shrinkages of the organic aerogels are measured using a difference between a length of one edge of wet gel before drying and a length of one edge of wet gel after drying.

$$\text{Linear shrinkage}(\%) = (L_{wet} - L_{dry})/L_{wet} \times 100$$

The densities of the organic aerogels are measured using volume and weight of the obtained samples.

The thermal conductivities of the organic aerogels are measured using heat flow meter (ASTM F 433, manufactured by Netzsch Co.).

The results are provided in Table 1.

TABLE 1

| | Linear shrinkage (%) | Density ($g/cm^3$) | Thermal conductivity (mW/mK) |
|---|---|---|---|
| Example 1 | — | 0.285 | 17.96 |
| Example 2 | 16.3 | 0.255 | 16.34 |
| Example 3 | — | 0.280 | 19.32 |
| Example 4 | 19.0 | 0.281 | 18.49 |
| Example 5 | 22.2 | 0.341 | 24.93 |
| Example 6 | 26.2 | 0.395 | 27.06 |
| Comparative Example | — | 0.248 | 16.35 |

As shown in Table 1, the organic aerogels according to Examples 1 to 6 had relatively low density ranging from about 0.2 to 0.4 $g/cm^3$ and relatively low thermal conductivity ranging from about 30 mW/mK or less, and thus had a similar density and hence insulating characteristics to that of the comparative example. In addition, the organic aerogels according to Examples 2 and 4 to 6 had good shrinkage relative to the comparative example, of about 30% or less after drying the corresponding wet gel.

Therefore, the organic aerogel of the above exemplary embodiments exhibited higher mechanical strength but similar density and insulation characteristics to that of the comparative example.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organic aerogel comprising a polymer obtained from a substituted or unsubstituted maleimide compound and a compound having at least two vinyl groups.

2. The organic aerogel of claim 1, wherein the substituted or unsubstituted maleimide compound comprises a compound represented by the following Chemical Formula 1:

Chemical Formula 1

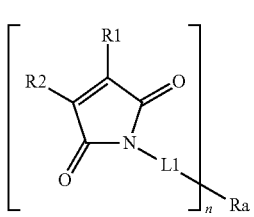

wherein, in Chemical Formula 1, R1 and R2 are independently hydrogen or a substituted or unsubstituted C1 to C30 alkyl group, L1 is selected from a single bond, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, and a combination comprising at least one of the foregoing groups, n is an integer of from 1 to 3, wherein when n is 1, Ra is a substituted or unsubstituted C3 to C30 cycloalkyl group, a substituted or unsubstituted C6 to C30 aryl group, a substituted or unsubstituted C3 to C30 cycloalkyl group including N, O, S, or P, a substituted or unsubstituted C6 to C30 aryl group including N, O, S, or P, or a combination comprising at least one of the foregoing groups, and wherein when n is 2 or 3, Ra is a substituted or unsubstituted C3 to C30 cycloalkylene group, a substituted or unsubstituted C6 to C30 arylene group, a substituted or unsubstituted C3 to C30 cycloalkylene group including N, O, S, or P, a substituted or unsubstituted C6 to C30 arylene group including N, O, S, or P, or a combination comprising at least one of the foregoing groups.

3. The organic aerogel of claim 2, wherein the substituted or unsubstituted maleimide compound comprises a substituted or unsubstituted bismaleimide compound represented by the following Chemical Formula 2:

Chemical Formula 2

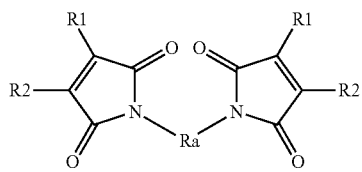

wherein, in Chemical Formula 2, R1 and R2 are independently hydrogen or a substituted or unsubstituted C1 to C30 alkyl group, and Ra is a substituted or unsubstituted C3 to C30 cycloalkylene group, a substituted or unsubstituted C6 to C30 arylene group, a substituted or unsubstituted C3 to C30 cycloalkylene group including N, O, S, or P, a substituted or unsubstituted C6 to C30 arylene group including N, O, S, or P, or a combination comprising at least one of the foregoing groups.

4. The organic aerogel of claim 3, wherein the substituted or unsubstituted bismaleimide compound is represented by at least one compound of the following Chemical Formulae 3 to 5:

Chemical Formula 3

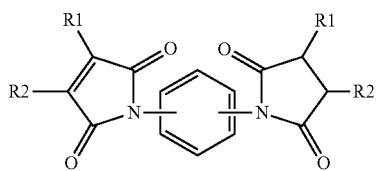

Chemical Formula 4

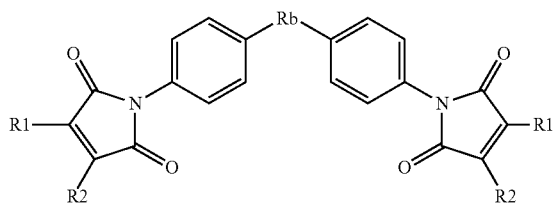

Chemical Formula 5

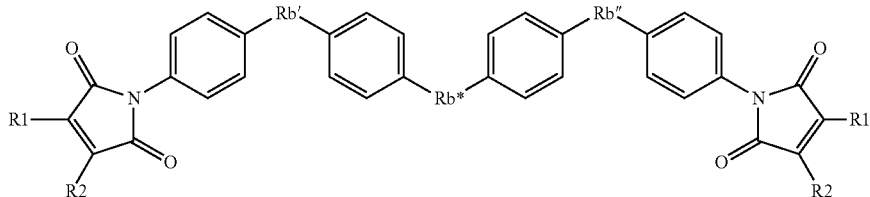

wherein, in Chemical Formulae 3 to 5, R1 and R2 are independently hydrogen or a substituted or unsubstituted C1 to C30 alkyl group, and Rb, Rb', Rb'', and Rb''' are independently a C1 to C10 alkyl group, a C1 to C10 heteroalkyl group, N, O, S, P, or a combination comprising at least one of the foregoing groups.

5. The organic aerogel of claim 1, wherein the compound having at least two vinyl groups comprises an aromatic compound having substituted or unsubstituted two vinyl groups, a substituted or unsubstituted acrylate compound, a substituted or unsubstituted acrylamide compound, or a combination comprising at least one of the foregoing compounds.

6. The organic aerogel of claim 5, wherein the compound having at least two vinyl groups comprises at least one of the compounds represented by the following Chemical Formulae 6 to 11:

Chemical Formula 6

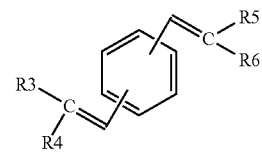

Chemical Formula 7

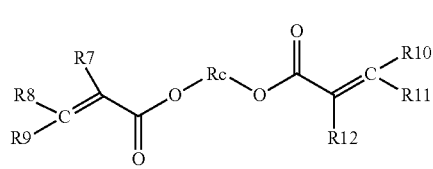

Chemical Formula 8

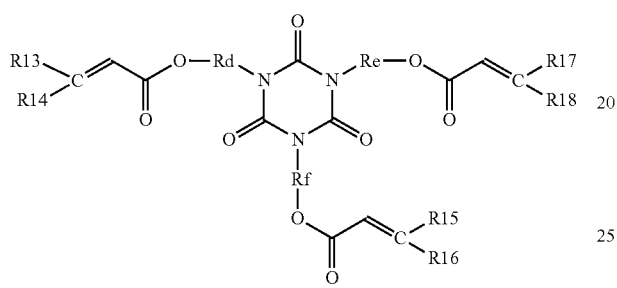

Chemical Formula 9

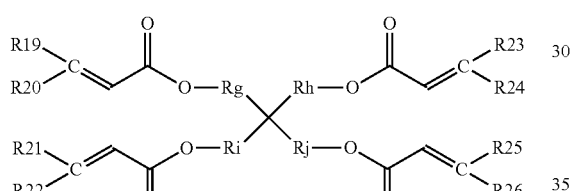

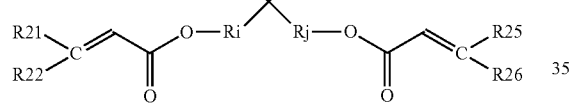

Chemical Formula 10

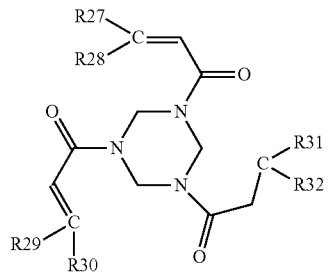

Chemical Formula 11

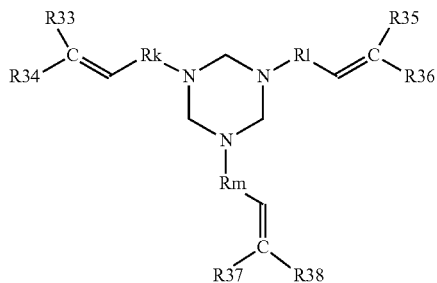

wherein, in Chemical Formulae 6 to 11, R3 to R38 are independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C30 alkoxy group, a substituted or unsubstituted carbonyl group, a hydroxy group, or a combination comprising at least one of the foregoing groups, and Rc to Rm are independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, or a combination comprising at least one of the foregoing groups.

7. The organic aerogel of claim 1, wherein the organic aerogel has a plurality of pores having a size of from about 2 to about 50 nm.

* * * * *